(No Model.)

C. CADE.
COMPENSATING DEVICE.

No. 525,258. Patented Aug. 28, 1894.

WITNESSES:
William J. Miller
Chas. E. Poensgen

INVENTOR
Charles Cade
BY Hauff & Hauff
ATTORNEYS

UNITED STATES PATENT OFFICE.

CHARLES CADE, OF BROOKLYN, NEW YORK.

COMPENSATING DEVICE.

SPECIFICATION forming part of Letters Patent No. 525,258, dated August 28, 1894.

Application filed November 9, 1893. Serial No. 490,451. (No model.)

*To all whom it may concern:*

Be it known that I, CHARLES CADE, a subject of the Queen of Great Britain, residing at Brooklyn, in the county of Kings and State of New York, have invented new and useful Improvements in Compensating Devices, of which the following is a specification.

The object of this invention is to provide new and improved compensating means for transmission wires as for example the wires used in such localities as railroads for transmitting motion from a lever to a semaphore or signal located at a distance from the lever and which wires on account of their expansion and contraction caused by their exposure to changes in weather and temperature are apt to interfere more or less with the satisfactory transmission of power. Such variations in the length of the wire are compensated for by the device set forth in the following specification and claims and illustrated in the annexed drawings, in which—

Figure 1:
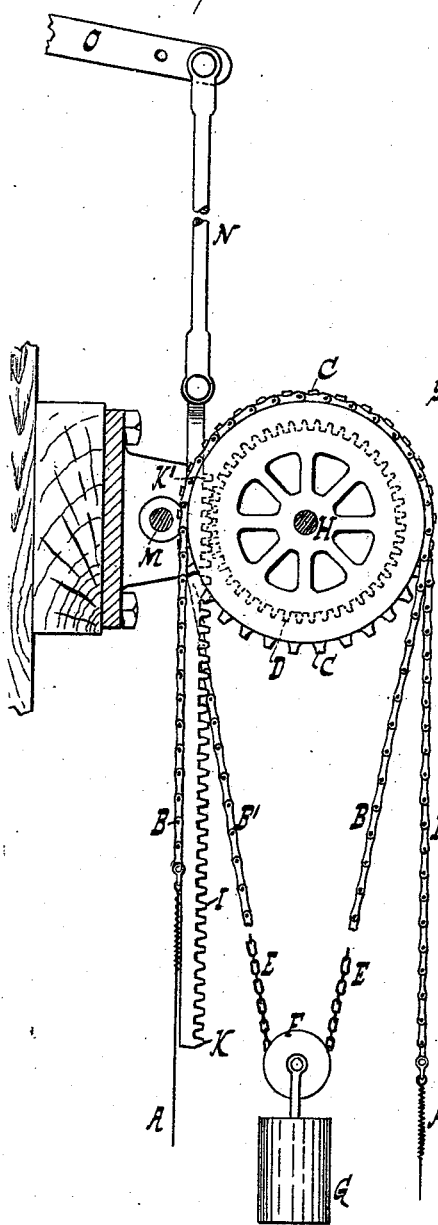
Figure 2:
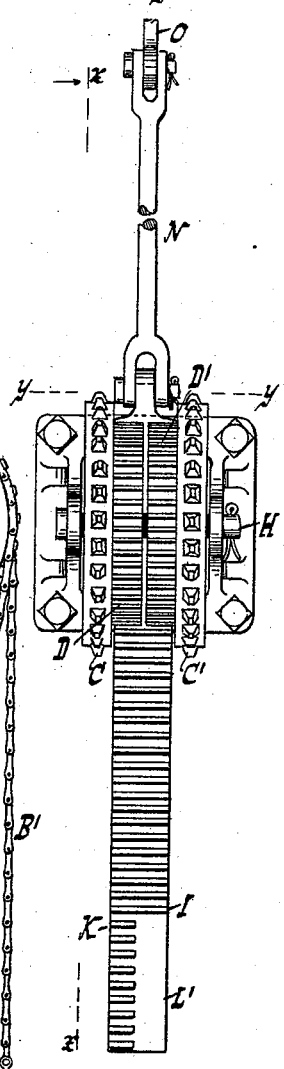
Figure 3:
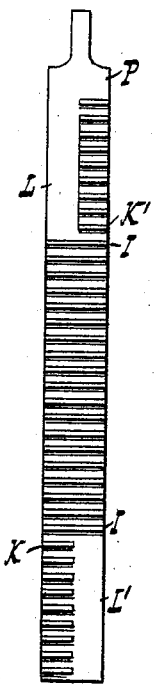
Figure 4:
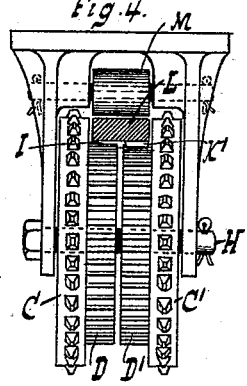

Figure 1 is a side elevation of the device sectioned along $x\ x$ Fig. 2. Fig. 2 is a front elevation of the device. Fig. 3 is a face view of a rack. Fig. 4 is a section along $y\ y$ Fig. 2.

In the drawings the letters A A' indicate two transmission wires one of which is to serve for throwing the signal into view and the other for withdrawing the signal from view. In some structures the arrangement is simplified by having only one wire for actuating the signal the latter on the return movement of the wire being allowed to fall by its weight or actuated by a spring but the arrangement of an actuating and withdrawing wire is generally preferred as being more reliable. My invention however is applicable as well to a device with but one actuating wire as to a device with more than one wire.

The wire A is connected to a sprocket chain B engaged or passed about a sprocket wheel C. The wire A' is connected to a sprocket chain B' engaged or passed about a sprocket wheel C'. The sprocket wheel C is fixed to a gear wheel D and the sprocket wheel C' is fixed to a gear wheel D'.

The free ends of the sprocket chains B B' are connected to a chain or cord E connected by pulley F to a weight G so that the weight will exert a pull on both sprocket chains but each sprocket chain might if desired be provided with its own individual weight suspended from the free end of each sprocket chain.

The gear wheels D D' with their respective sprocket wheels C C' are independently mounted on the shaft H so as to be capable of independent rotation. The gear wheels D D' are actuated by a rack bar comprising three teeth portions I K and K'. The tooth portion I of the rack bar is adapted for the common engagement of the gear wheels D D' said teeth I being of sufficient width to mesh into both of said gear wheels. The tooth portion K of the rack engages only the gear wheel D and the tooth portion K' engages only the gear wheel D'. The rack portions L L' are free from teeth and may be properly called releasing portions, the releasing portion L being located to correspond to the tooth portion K' and the releasing portion L' being located to correspond to the tooth portion K.

When the tooth portion K is in engagement with the gear wheel D the releasing portion L' is at the gear wheel D' so that the latter with sprocket wheel C' is free to rotate under the action of weight G on sprocket chain B' so that in case the wire A' is slack it will be tightened by the action of said weight or should the wire A' have a tendency to contract or shorten said wire A' will correspondingly pull or move the weight G. When the tooth portion K' is in engagement with the gear wheel D' the releasing portion L is at the gear wheel D so that the latter with sprocket wheel C is now free for the weight G to exert its compensating action relative to sprocket chain B and wire A.

The rack bar I K K' is held by a guide roller M toward the gear wheels D D' and said rack is connected or jointed by link or connection N to any suitable actuating lever or handle O.

I have mentioned the device as being useful in the actuation of railroad signals but of course I do not limit the application of my device to use on railroads.

By providing the rack bar with a toothless space P both wheels C C' can be freed by moving the rack bar a sufficient distance so that the weight G is now free to exert a simultaneous compensating action on both wires A A'.

What I claim as new, and desire to secure by Letters Patent, is—

1. The combination with independently movable gear wheels, and an actuating rack provided with a tooth portion for the common engagement of the gear wheels and with other tooth portions and releasing portions for the alternate engagement and release of the gear wheels, of a sprocket wheel connected to each gear wheel, a sprocket chain engaged about each sprocket wheel, a wire or connection connected to one end of each sprocket chain, and a compensating weight connected to the other end of each sprocket chain substantially as described.

2. The combination with independently movable gear wheels, and an actuating rack provided with a tooth portion for the common engagement of the gear wheels and with other tooth portions and releasing portions for the alternate engagement and release of the gear wheels, of a sprocket wheel connected to each gear wheel, a sprocket chain engaged about each sprocket wheel, a wire or connection connected to one end of each sprocket chain and a compensating weight connected to the other ends of both sprocket chains substantially as described.

3. The combination of independently movable gear-wheels, a sprocket-wheel connected to each gear-wheel, a sprocket-chain engaged by each sprocket-wheel, a wire or connection connected to one end of each sprocket-chain, a compensating weight connected to the other end of each sprocket-chain, a reciprocating rack-bar having a toothed portion I common to both gear-wheels, toothed portions K and K' to respectively engage said gear-wheels, and a toothless portion P common to both gear wheels, a guide bearing against the rack-bar to hold it in proper relation to the gear-wheels, and means for reciprocating the rack-bar, substantially as described.

In testimony whereof I have hereunto set my hand in the presence of two subscribing witnesses.

CHARLES CADE.

Witnesses:
 WM. C. HAUFF,
 E. F. KASTENHUBER.